Jan. 30, 1951

G. H. McINTYRE 2,539,694

CONTINUOUS SMELTER

Filed Feb. 17, 1948

INVENTOR.
GLENN H. McINTYRE
BY
Oberlin & Limbach
ATTORNEYS.

Jan. 30, 1951 G. H. McINTYRE 2,539,694
CONTINUOUS SMELTER
Filed Feb. 17, 1948 3 Sheets-Sheet 2

INVENTOR.
GLENN H. McINTYRE
BY
Oberlin & Limbach
ATTORNEYS.

Jan. 30, 1951 G. H. McINTYRE 2,539,694
CONTINUOUS SMELTER
Filed Feb. 17, 1948 3 Sheets-Sheet 3

INVENTOR.
GLENN H. McINTYRE
BY
Oberlin & Limbach
ATTORNEYS.

Patented Jan. 30, 1951

2,539,694

UNITED STATES PATENT OFFICE 2,539,694

CONTINUOUS SMELTER

Glenn H. McIntyre, Cleveland Heights, Ohio, assignor to Ferro Enamel Corporation, Cleveland, Ohio, a corporation of Ohio Application February 17, 1948, Serial No. 8,770

4 Claims. (Cl. 263—11)

The present invention, relating generally as indicated to continuous smelters, has more particular regard to certain improvements in that type of smelter which is especially suited for continuously melting glass, vitreous enamel, or like material.

Continuous smelters have been heretofore developed for melting material of the character indicated and as disclosed in Patents 2,097,378 and 2,097,379, issued on October 26, 1937, of which I am one of the joint inventors, such smelters generally comprise a melting chamber into which suitably pulverized raw material is charged, such material being melted by heating flames passing through said melting chamber. The material so melted then flows into a fining chamber wherein the "seeds" (particles of unmelted material) are eliminated and thence the fined material is drawn off. In the production of enamel frit, the melted material is drawn off into water and of course raw material is charged into the melting chamber whereby melted material may be continuously drawn off.

It is one principal object of this invention to provide a continuous smelter which is simple in construction but yet is capable of effectively and economically melting and fining material charged thereinto to produce a finished product of uniform superior quality.

Other objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail one illustrative embodiment of the invention, this being indicative however, of but one of the various ways in which the principle of the invention may be employed.

Figure 1:
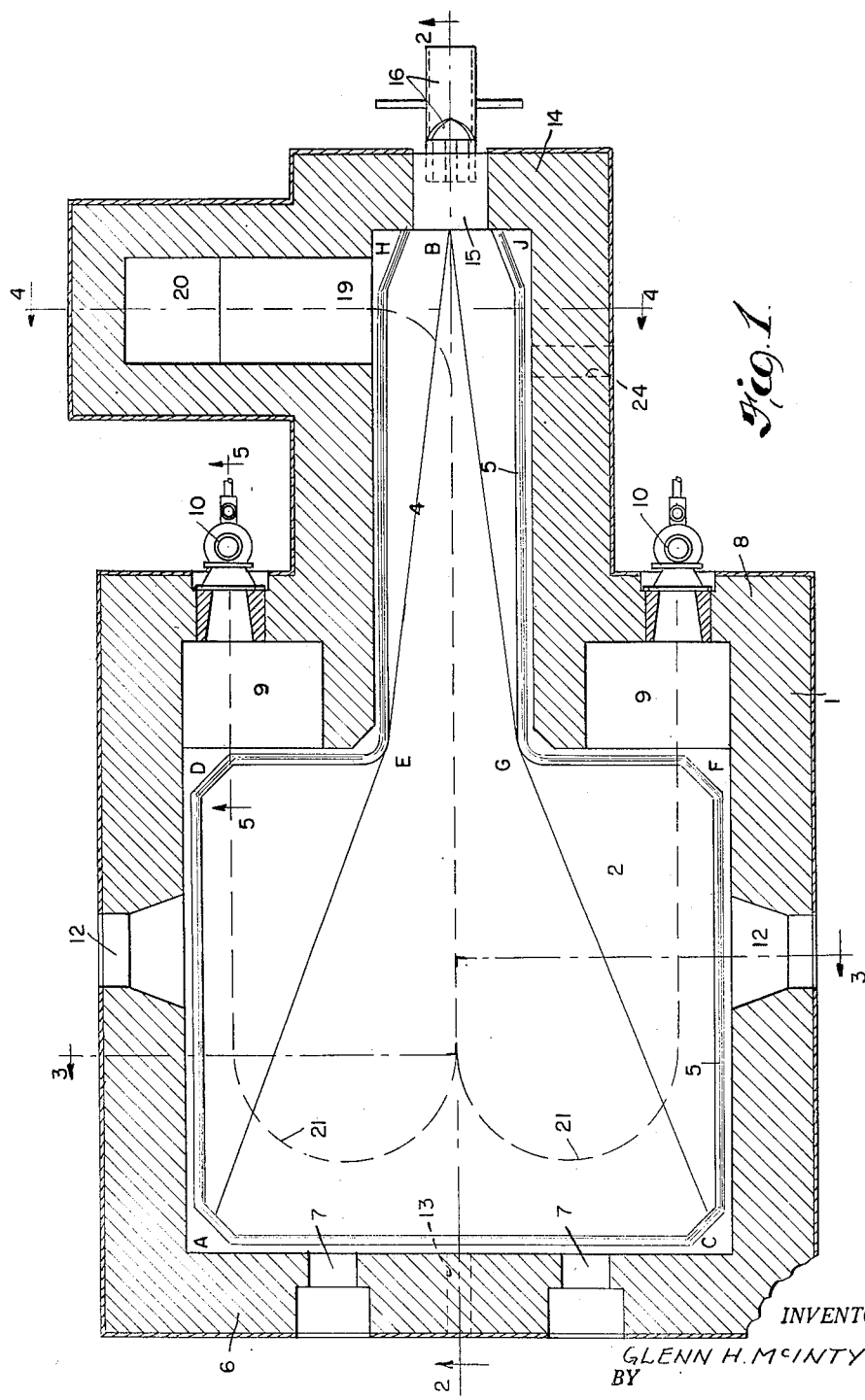
Fig. 1 is a horizontal cross section view of a smelter embodying the present improvements.
Figure 2:
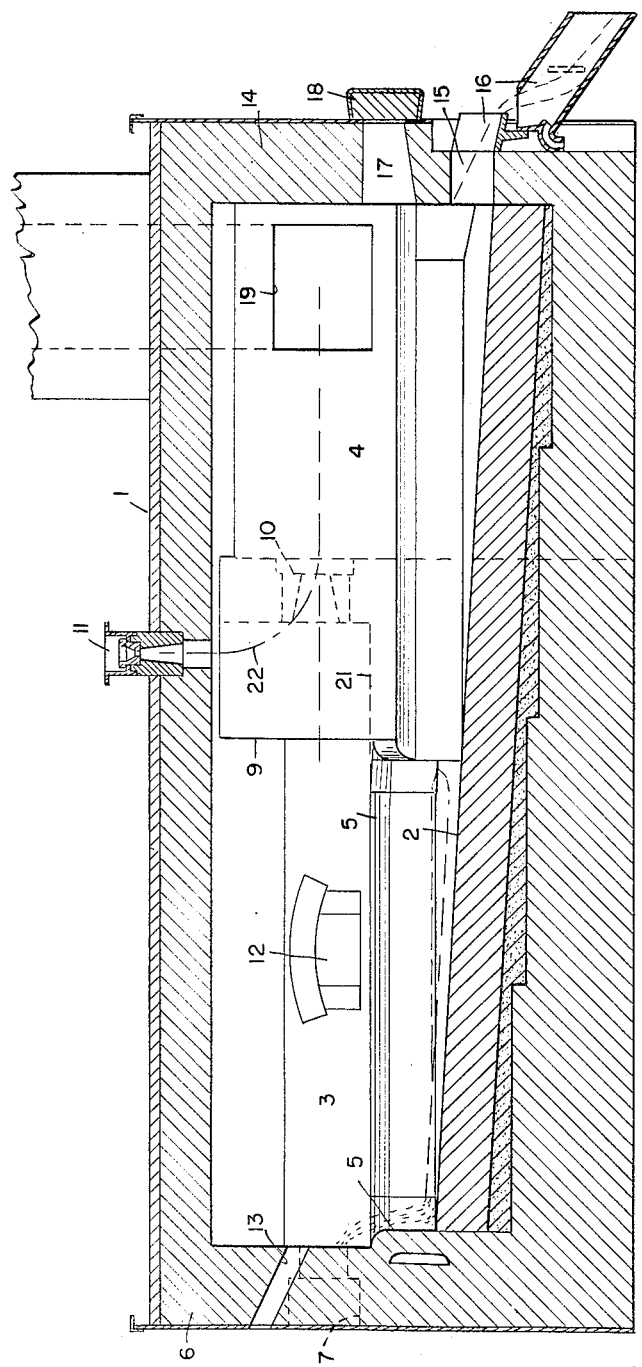
Fig. 2 is a central vertical cross section view of the smelter illustrated in Fig. 1 taken along a plane indicated by the line 2—2 of Fig. 1.
Figure 3:
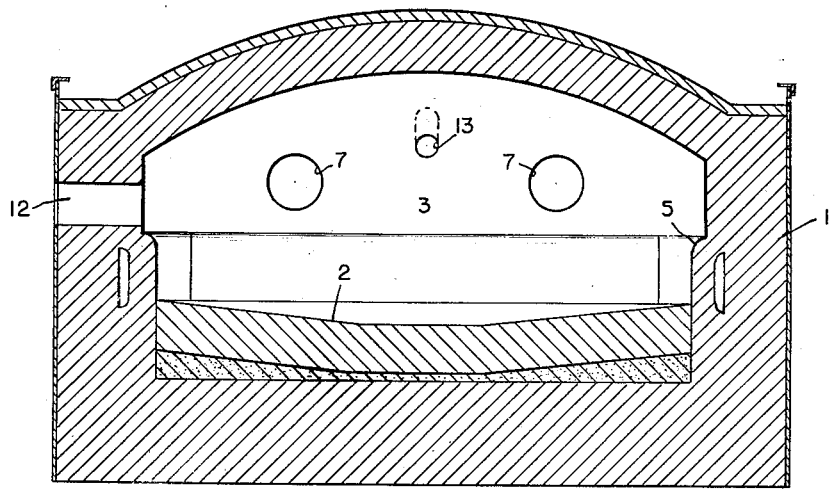
Fig. 3 is a cross section transversely through the melting chamber taken along the line 3—3, Fig. 1.
Figure 4:
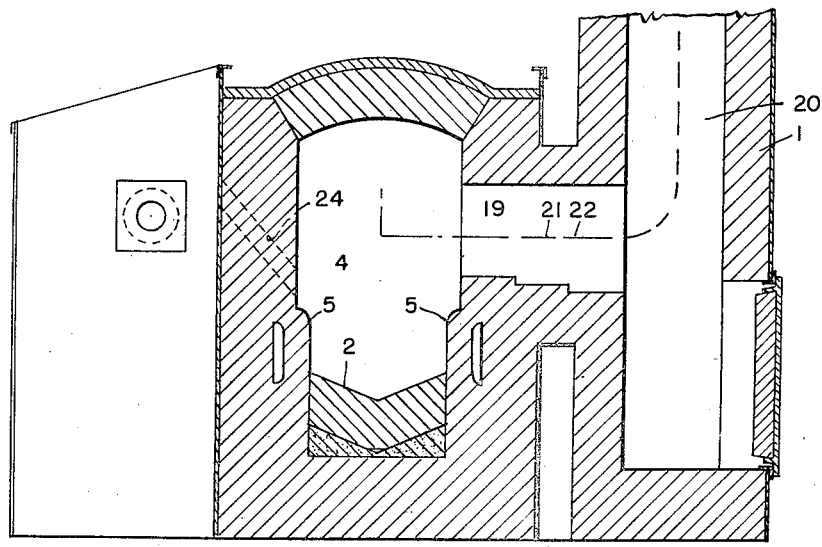
Fig. 4 is a cross section view transversely through the fining chamber taken along the line 4—4, Fig. 1.
Figure 5:
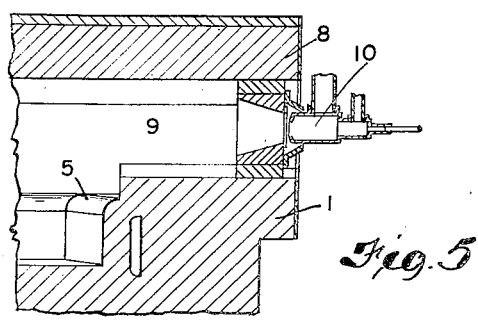
Fig. 5 is a fragmentary vertical cross section view through one of the burner combustion chambers taken along the line 5—5, Fig. 1.

Referring now to the drawing, the smelter I which is illustrated therein is simply an elongated enclosed structure having a bottom, side walls, end walls, and an arched roof of the usual fire brick and insulating brick construction held together by suitable structural iron members. The hearth 2 of the smelter is inclined downwardly from end to end and in plan view defines with the side and end walls extending upwardly therefrom two contiguous coaxial rectangular melting and fining chambers 3 and 4, the melting chamber 3 at the upper end of the hearth being of transverse width several times greater than that of the fining chamber 4 at the lower end of the hearth. In the present embodiment of the invention the side and end walls comprise in part a ventilated curb wall 5 which has thereabout an air passage through which air may be circulated to retain such walls at a temperature somewhat below that of the material in contact therewith.

Through the end wall 6 and above the curb wall 5 are two transversely spaced charging openings 7 through which material to be melted may be charged into the melting chamber 3. In the end wall 8 which is opposite to end wall 6 and in those portions thereof which are transversely beyond the transverse width of the fining chamber 4 are formed combustion chambers 9, the bottom walls of which provide firing shelves above the curb wall 5 to catch any drippings from the hydrocarbon burners 10 which are projected through the end wall 8. The burners 10 are directed toward the end wall 6 for a purpose which will become apparent as the description proceeds.

A booster burner 11 is preferably projected vertically downward through the roof of the smelter in a plane near the entrance to the fining chamber 4.

The walls of the melting chamber 3 are formed with conveniently located inspection openings 12 which are ordinarily closed by suitable doors (not shown) and with an opening 13 through which a pyrometer or like temperature-indicating device may be inserted and focused on a point near the center of the hearth of the melting chamber 3.

The fining chamber 4 is open at its upper end and is in communication with melting chamber 3 and at its lower end the end wall 14 thereof is formed with a discharge opening 15 for drawing off melted material from the fining chamber. A suitable downwardly inclined spout and trough 16 is mounted on the smelter at end wall 14 to direct such melted material into a suitable container which in the case of producing enamel frit, for example, comprises a tank containing water. Above the discharge opening 15 is a raking opening 17 through which various tools may be inserted for periodically clearing out the hearth of the fining chamber 4 as when the smelter is shut down for repairs or the material to be melted is to be changed. In normal usage of the smelter, opening 17 is closed by the door 18. A suitable pyrometer opening 24 is formed in the side wall of the fining chamber and near the discharge opening for taking temperature measurements at approximately the center line of the hearth 2.

Through the side wall of the fining chamber, above curb wall 5 and near the end wall 14, is a flue opening 19 in communication with a stack 20 for carrying away burned gases from within the smelter. It can now be seen that heating flames issuing from the burners 10 will follow a path generally indicated by the dot-dash line 21 in Fig. 1, first toward the end wall 6 and then each flame forming a loop to the central longitudinal axis of the melting chamber 3 at which axis such flame loops join one another and together pass straight through the melting chamber 3 and the fining chamber 4 and then finally out through the flue opening 19 into the stack 20. In fining chamber 4 the heating flame 22 from the booster burner 11 joins the partially-spent heating flames 21 to intensify the same and thus effectively retain the desired high temperature in the fining chamber 4.

With the burners and chambers arranged as disclosed, the entire area of the melting chamber 3 is subjected to uniform heat of high intensity for quickly and efficiently melting material charged thereinto. Likewise the joining of heating flames 21 with one another and with heating flame 22 assures that the material in the fining chamber 4 will be retained in a molten state and at an elevated temperature to effectuate elimination of any "seeds" therein.

By proportioning the transverse widths of the melting and fining chamber as aforesaid, the material charged into the melting chamber 3 will be thinly spread out so as to present a large area whereby the heat from the heating flames 21 quickly and uniformly melts the material. As the material is progressively melted and the temperature of the melted mass gradually increased the fluidity thereof is correspondingly increased. The fining chamber 4 is of transverse width much less than that of the melting chamber 3, and accordingly the average velocity of the molten material along any transverse section of the smelter is substantially constant. The rates of drawing off of molten material and of charging of material may of course be equalized so that the smelter may be operated continuously and only shut down for repairs or for changing the material to be melted.

As shown in Fig. 1, the area of the hearth 2 bounded by the triangle ABC is continuously and uniformly inclined downwardly from the charging to the discharging end of the smelter. The areas of the hearth bounded by the triangles ADE and CFG in the melting chamber 3 and the triangles BEH and BGJ in the fining chamber 4 are not only all likewise inclined downwardly toward the discharge opening 15 but are inclined downwardly transversely toward the central axis through the melting and fining chambers.

Such inclining of the hearth assures that melted material in the melting chamber 3 will smoothly flow with minimum restriction into the fining chamber 4 and thence straight through the latter to the discharge opening 15, the flow through the entire smelter being such as to avoid sharp turns and the reversing of the direction of flow of the melted material. The cooling of the curb wall 5 minimizes erosion hereof in that a layer of chilled material collects thereon to function more or less as a protective coating.

The continuous downward sloping of the hearth 2 in this smelter and the difference in the transverse spacing between the side walls of the melting and fining zones or chambers assures a more uniform final product than is obtainable with prior art smelters wherein the level of the melted material in flowing from the melting zone to the fining zone abruptly drops. While the abrupt dropping of the level of the melted material and the flowing thereof into a deep pool is not objectionable in the production of ordinary glass consisting essentially of silica with minor portions of other ingredients, it has been found that it is objectionable to abruptly drop the level of the melted material in the case of porcelain enamels, for example, which are heavily loaded with opacifiers, etc. in that segregation occurs, thus producing a non-uniform final product. By laterally constricting the melted material as it flows from the melting zone into the fining zone, as previously mentioned, the rate of flow of melted material through the smelter is substantially uniform. In this way rapid run-off of certain of the lower melting materials in local areas is prevented and accordingly segregation—the batch is prevented whereby a more uniform product is assured.

Other modes of applying the principle of the invention may be employed, change being made as regards the details described, provided the features stated in any of the following claims or the equivalent of such be employed.

I therefore particularly point out and distinctly claim as my invention:

1. In a smelter of the character described, the combination of a substantially T-shaped hearth sloping throughout its entire area to a low point at the lower end of the stem of such T-shape, a confining structure comprising upstanding walls and a roof, arranged about and over said hearth and forming therewith a substantially closed T-shaped chamber, said confining structure provided with separate discharge ports at the lower end of the stem of said T-shaped chamber respectively at and above hearth level for discharge of melted material and heating flames respectively, said confining structure in the area farthest remote from said discharge opening provided with a raw material charging opening, and in the area of the base of the head of such T-shape at opposite sides of the stem thereof provided with burner openings.

2. In a smelter of the character described, the combination of a substantially T-shaped hearth sloping throughout its entire area to a low point at the lower end of the stem of such T-shape, a confining structure comprising upstanding walls and a roof, arranged about and over said hearth and forming therewith a substantially closed T-shaped chamber, said confining structure provided with separate discharge ports at the lower end of the stem of said T-shaped chamber respectively at and above hearth level for discharge of melted material and heating flames respectively, said confining structure in the area farthest remote from said discharge opening provided with a raw material charging opening, and in the area of the base of the head of such T-shape at opposite sides of the stem thereof provided with burner openings, said burner openings containing burners directed toward said raw material charging opening and whereby heating flames from said burner passes through said T-shaped chamber forming a loop at said charging opening end of said T-shaped chamber.

3. In a smelter of the character described, the combination of a substantially T-shaped hearth sloping throughout its entire area to a low point at the lower end of the stem of such T-shape, a confining structure comprising upstanding walls and a roof, arranged about and over said hearth and forming therewith a substantially closed T-shaped chamber, said confining structure provided with separate discharge ports at the lower end of the stem of said T-shaped chamber respectively at and above hearth level for discharge of melted material and heating flames respectively, said confining structure in the area farthest remote from said discharge opening provided with a raw material charging opening, and in the area of the base of the head of such T-shape at opposite sides of the stem thereof provided with burner openings, and an air ventilated curb around the periphery of the hearth of said T-shaped chamber.

4. In a smelter of the character described, the combination of a substantially T-shaped hearth sloping throughout its entire area to a low point at the lower end of the stem of such T-shape, a confining structure comprising upstanding walls and a roof, arranged about and over said hearth and forming therewith a substantially closed T-shaped chamber, and a ventilated curb around the periphery of the hearth of said T-shaped chamber; the head comprising the melting chamber and the stem comprising the fining chamber of said T-shaped hearth, said melting and fining chambers respectively provided with transversely spaced charging openings for material to be melted and a discharge opening for melted material, transversely spaced burners in the other end of said melting chamber directed toward said charging openings, a flue opening in said fining chamber near said discharge opening whereby heating flames from said burners pass through both of said chambers forming loops joining at the charging opening and of said melting chamber which passes together through said fining chamber and a third burner in said fining chamber near the end thereof in communication with said melting chamber, said third burner being downwardly directed whereby heating flame therefrom joins those from said other burner, and together pass through said fining chamber to said flue opening.

GLENN H. McINTYRE.

REFERENCES CITED

The following references are of record in the file of this patent:

UNITED STATES PATENTS

| Number | Name | Date |
| --- | --- | --- |
| 1,220,444 | Naismith | Mar. 27, 1917 |
| 1,460,888 | Cook | July 3, 1923 |
| 2,042,560 | Stewart | June 2, 1936 |
| 2,097,378 | McIntyre et al. | Oct. 26, 1937 |
| 2,262,069 | Turk | Nov. 11, 1941 |
| 2,385,529 | Moorshead | Sept. 25, 1945 |